United States Patent
Sugiyama

(10) Patent No.: US 11,669,107 B2
(45) Date of Patent: Jun. 6, 2023

(54) ROBOT GUIDANCE SYSTEM

(71) Applicant: HONDA MOTOR CO., LTD., Tokyo (JP)

(72) Inventor: Kenichiro Sugiyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/043,131

(22) PCT Filed: Dec. 25, 2018

(86) PCT No.: PCT/JP2018/047536
§ 371 (c)(1),
(2) Date: Sep. 29, 2020

(87) PCT Pub. No.: WO2019/202778
PCT Pub. Date: Oct. 24, 2019

(65) Prior Publication Data
US 2021/0026371 A1    Jan. 28, 2021

(30) Foreign Application Priority Data
Apr. 20, 2018    (JP) .............................. JP2018-081741

(51) Int. Cl.
*G05D 1/02*    (2020.01)
*B25J 5/00*    (2006.01)

(52) U.S. Cl.
CPC .............. *G05D 1/0289* (2013.01); *B25J 5/00* (2013.01)

(58) Field of Classification Search
CPC .. G05D 1/0289; G05D 1/0274; G05D 1/0891; G05D 2201/0211; B25J 5/00; G05C 21/26
See application file for complete search history.

(56) References Cited

U.S. PATENT DOCUMENTS

| | | | | |
|---|---|---|---|---|
| 7,720,685 | B2 * | 5/2010 | Sakagami | G06Q 99/00 704/277 |
| 8,180,486 | B2 * | 5/2012 | Saito | G01S 5/0252 700/245 |
| 2015/0346727 | A1 * | 12/2015 | Ramanujam | G05D 1/0088 701/23 |
| 2017/0225336 | A1 * | 8/2017 | Deyle | G08B 13/196 |
| 2017/0285635 | A1 * | 10/2017 | Sisbot | G05D 1/0027 |
| 2017/0357256 | A1 * | 12/2017 | Mizutani | G05D 1/0223 |

(Continued)

FOREIGN PATENT DOCUMENTS

| | | |
|---|---|---|
| JP | 2001-212782 | 8/2001 |
| JP | 2001212782 A * | 8/2001 |
| JP | 2003-345436 | 12/2003 |

(Continued)

OTHER PUBLICATIONS

International Search Report, dated Mar. 19, 2019, 2 pages.

*Primary Examiner* — Khoi H Tran
*Assistant Examiner* — Nhi Q Bui
(74) *Attorney, Agent, or Firm* — Rankin, Hill & Clark LLP

(57) ABSTRACT

A guidance system S includes a plurality of autonomous mobile robots (1) which guide a user to a destination, and a reception apparatus (2) which is provided separately from the robots (1) and recognizes the destination. Availability of each of the plurality of robots (1) is managed based on a state of the robot and the destination.

6 Claims, 8 Drawing Sheets

(56) References Cited

U.S. PATENT DOCUMENTS

2018/0009108 A1* 1/2018 Yamamoto ........... G01C 21/206
2019/0061166 A1* 2/2019 Dai ..................... G05D 1/0297

FOREIGN PATENT DOCUMENTS

| | | | | |
|---|---|---|---|---|
| JP | 2006-198730 | | 8/2006 | |
| JP | 2006198730 A | * | 8/2006 | |
| JP | 2007-260822 | | 10/2007 | |
| JP | 2008-151531 | | 7/2008 | |
| JP | 2008151531 A | * | 7/2008 | |
| JP | 2009-057197 | | 3/2009 | |
| JP | 2009057197 A | * | 3/2009 | |
| JP | 2015087799 A | * | 5/2015 | ............. G06Q 10/06 |
| JP | 2016-179674 | | 10/2016 | |
| JP | 2016179674 A | * | 10/2016 | |

* cited by examiner

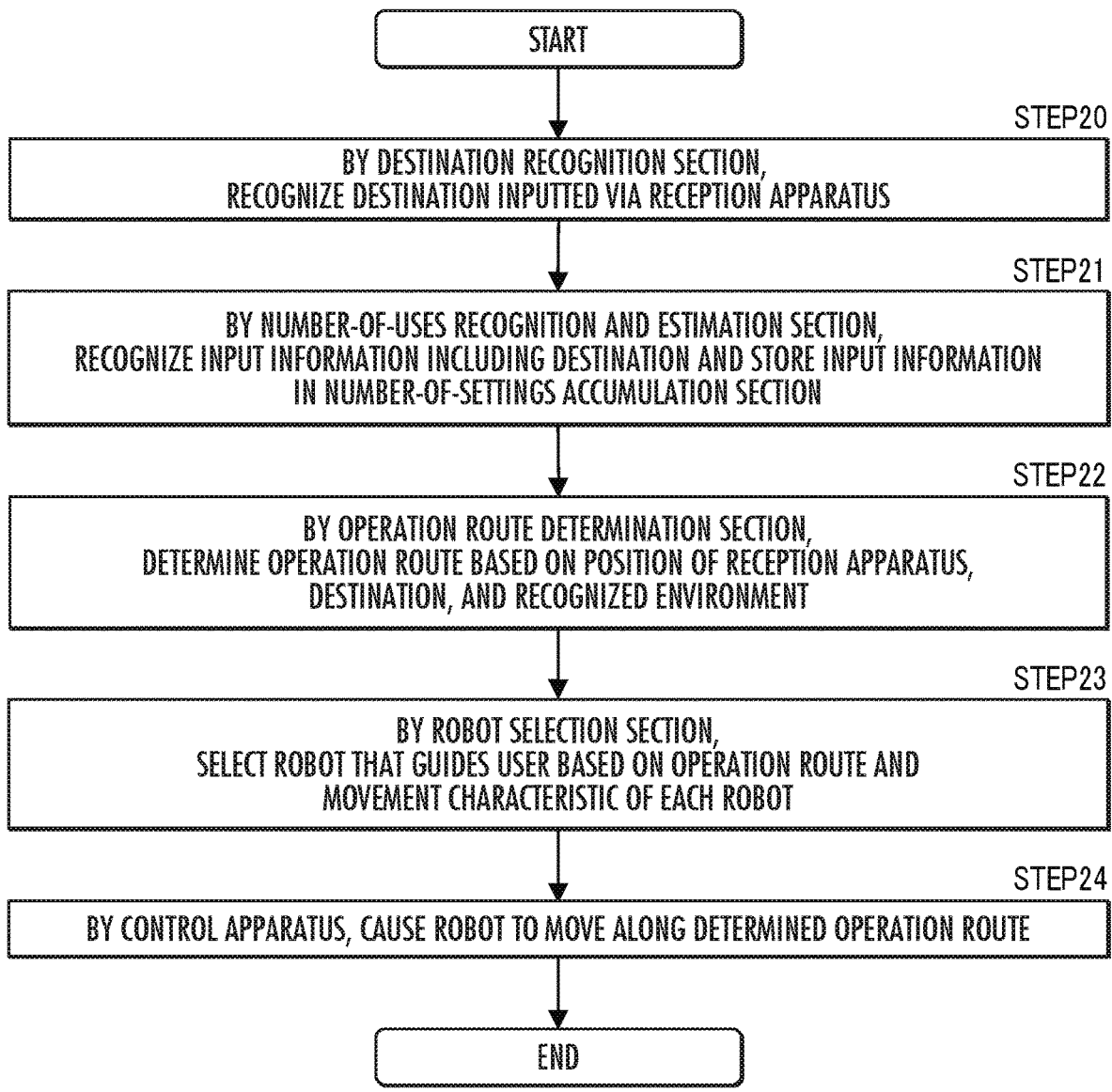

ROBOT GUIDANCE SYSTEM

TECHNICAL FIELD

The present invention relates to a robot guidance system which guides a user to a destination by causing an autonomous mobile robot to move with the user.

BACKGROUND ART

Conventionally, a robot guidance system using an autonomous mobile robot which guides a user to a destination is known. For autonomous mobile robots used in such a type of robot guidance systems, an autonomous mobile robot including various sensors and the like (for example, a camera and the like) to control own movement, locate a current position, and the like is known (for example, see Patent Literature 1).

CITATION LIST

Patent Literature

Patent Literature 1: Japanese Patent Laid-Open No. 2007-260822

SUMMARY OF INVENTION

Technical Problem

In a conventional robot guidance system as described in Patent Literature 1, the autonomous mobile robot itself is configured to recognize a destination of a user. Accordingly, the autonomous mobile robot needs to include an input interface to know the destination of the user, in addition to the various sensors and the like.

As a result, in the conventional robot guidance system, the autonomous mobile robot has a complicated structure, and various costs (specifically, installation cost, cost for management and maintenance, and the like) may increase. Costs are more likely to increase particularly when a plurality of autonomous mobile robots are operated.

The present invention has been made in view of such respects, and an object of the present invention is to provide a robot guidance system which can simplify a configuration of an autonomous mobile robot which guides a user.

Solution to Problem

A robot guidance system of the present invention includes:

a plurality of autonomous mobile robots which guide a user to a destination;

a reception apparatus which is provided separately from the plurality of autonomous mobile robots and recognizes the destination; and a robot management unit which recognizes a state of each of the plurality of autonomous mobile robots and manages availability of each of the plurality of autonomous mobile robots based on the recognized destination and the recognized state.

Here, the "state" of the autonomous mobile robot (hereinafter, also simply referred to as "robot") refers to a state that can affect a motion for guidance when the robot guides a user for a position of the robot, a movement characteristic that is a characteristic related to mobility of the robot (for example, a remaining battery charge amount or the like), and the like.

As described above, in the robot guidance system of the present invention, the autonomous mobile robots which actually guide a user and the reception apparatus which recognizes a destination of the user (that is, including an interface for receiving a user input) are configured independently of each other.

Thus, an interface for receiving an input from a user can be omitted from the robots. Accordingly, according to the robot guidance system of the present invention, the configuration of each autonomous mobile robot which guides a user can be simplified.

Note that the robot management unit in the present invention may be provided to the reception apparatus, may be mounted in each or any one of the plurality of autonomous mobile robots, or may be provided to a server or the like provided separately from any of the reception apparatus and the robots.

Preferably, the robot guidance system of the present invention includes:

a movement characteristic storage section which stores a movement characteristic that is a characteristic related to mobility of each of the plurality of autonomous mobile robots; and a robot selection section which selects at least one of the plurality of autonomous mobile robots as an autonomous mobile robot to guide the user, based on the destination recognized by the reception apparatus and the movement characteristic stored in the movement characteristic storage section.

With such a configuration, the robots can be efficiently operated in the robot guidance system.

Specifically, for the configuration in which a robot is selected by referring to the movement characteristic, for example, each of the plurality of autonomous mobile robots may be driven by an internal battery, the movement characteristic may be a characteristic including a remaining battery charge amount of each of the plurality of autonomous mobile robots, and the robot selection section may select at least one of the plurality of autonomous mobile robots as an autonomous mobile robot to guide the user, based on a distance to the destination recognized by the reception apparatus and the movement characteristic of each of the plurality of autonomous mobile robots.

As described above, when the remaining battery charge amount is the movement characteristic, a robot to perform guidance is selected based on the remaining battery charge amount and the destination, whereby the plurality of robots can be efficiently operated. Thus, the number of times of charging each robot can be reduced, and a waiting time of a user can be reduced. In addition, the number of robots required to configure the robot guidance system can be reduced.

Moreover, for example, the plurality of autonomous mobile robots may include a boardable robot which is capable of being boarded by the user and a non-boardable robot which is incapable of being boarded by the user, the movement characteristic may be a characteristic including a capability of being boarded by the user of each of the plurality of autonomous mobile robots, and the robot selection section may select at least one of the plurality of autonomous mobile robots as an autonomous mobile robot to guide the user, based on a distance to the destination recognized by the reception apparatus and the movement characteristic of each of the plurality of autonomous mobile robots.

As described above, when the capability of being boarded is the movement characteristic, operation is possible in which the non-boardable robot which leads the user (is incapable of being boarded by the user) is selected in a case of the near destination, and the boardable robot which is capable of being boarded by the user is selected in a case of the far destination. Thus, a robot from which a partial function (for example, a function capable of being boarded by the user, or the like) is omitted can also be adopted as a robot operated in the robot guidance system.

The robot guidance system of the present invention includes:

a plurality of the reception apparatuses;

a number-of-uses recognition and estimation section which recognizes the respective numbers of past uses of the reception apparatuses, or estimates the respective numbers of predicted uses of the reception apparatuses; and a waiting area determination section which determines, based on the numbers of uses, a waiting area where each of the plurality of autonomous mobile robots is caused to stand by among a plurality of waiting areas, and the number of the autonomous mobile robots caused to stand by in each of the plurality of waiting areas.

With such a configuration, occurrence of a situation where no robot exists in a vicinity of a user when the user requests guidance can be prevented, and accordingly, a waiting time of the user can be reduced.

Preferably, the robot guidance system of the present invention includes an operation route determination section which determines an operation route of each of the plurality of autonomous mobile robots, wherein the plurality of autonomous mobile robots include a first autonomous mobile robot and a second autonomous mobile robot, the first autonomous mobile robot includes a sensor which recognizes an environment around the first autonomous mobile robot, and the operation route determination section determines the operation route of the second autonomous mobile robot, based on the destination recognized by the reception apparatus and the environment recognized by the sensor of the first autonomous mobile robot.

In general, ab environment that hinders a movement of a robot is likely to also hinder a movement of another robot that has capabilities (for example, a size, traveling performance, and the like) corresponding or identical to the capabilities of the robot, and also hinder a movement of a user guided by the other robot.

Accordingly, if a configuration is made such that the operation route of the other robot (second autonomous mobile robot) is determined based on the environment recognized by the robot (first autonomous mobile robot) (that is, the environment around the route that may be followed by the other robot with high probability) as described above, the second autonomous mobile robot can smoothly guide a user.

Specifically, for example, if a configuration is made such that when an environment that hinders a movement of the first autonomous mobile robot is recognized, the operation route of the second autonomous mobile robot is determined so as to detour the environment, movements of the second autonomous mobile robot and the user guided by the second autonomous mobile robot are hardly hindered by the environment.

Preferably, the robot guidance system of the present invention includes:

an operation route determination section which determines an operation route of each of the plurality of autonomous mobile robots; and a sensor which recognizes an environment around the operation route, wherein the plurality of autonomous mobile robots include a third autonomous mobile robot and a fourth autonomous mobile robot to guide the user by taking over from the third autonomous mobile robot, and when an environment that does not hinder a movement of the user and hinders a movement of the third autonomous mobile robot is recognized around the operation route of the third autonomous mobile robot, the operation route determination section determines the operation route of the fourth autonomous mobile robot such that the fourth autonomous mobile robot moves to a position past the environment.

For example, environments include a topographic feature, such as an escalator, that is difficult for a robot (third autonomous mobile robot) to move across, but is not so difficult for a user to move across. Accordingly, when such an environment is recognized, the operation route of another robot (fourth autonomous mobile robot) that takes over the guidance of the user is set such that the other robot moves to a position past the environment (for example, an exit of the escalator), whereby an effect of the environment can be restrained, and the guidance of the user can be continued without a significant time lag.

In other words, if a configuration is made such that a plurality of robots cooperate to cover a problem based on the traveling performance of the robots, a function for supporting the environment can be omitted as appropriate, and accordingly, the configuration of each robot can be further simplified.

Preferably, the robot guidance system of the present invention includes a number-of-settings accumulation section which accumulates the number of times each of a plurality of points is set as the destination of the user.

With such a configuration, an important (for example, highly frequently used) destination can be easily recognized when an adjustment or the like is made to settings in the system. Thus, a function to be added to or adjusted in the operated robots can be easily found according to a characteristic of the important destination (for example, a distance from the reception apparatus, or the like). As a result, a function of the robots can be omitted as appropriate, and accordingly, the configuration of each robot can be further simplified.

BRIEF DESCRIPTION OF DRAWINGS

FIG. 5 is a schematic diagram showing an operation route when the guidance system in FIG. 1 causes the robot to stand by.

FIG. 8 is a flowchart showing processing performed when the guidance system in FIG. 1 guides the user.

DESCRIPTION OF EMBODIMENT

A robot guidance system (hereinafter, referred to as "guidance system S") according to an embodiment of the present invention will be described below with reference to the drawings.

Figure 5:
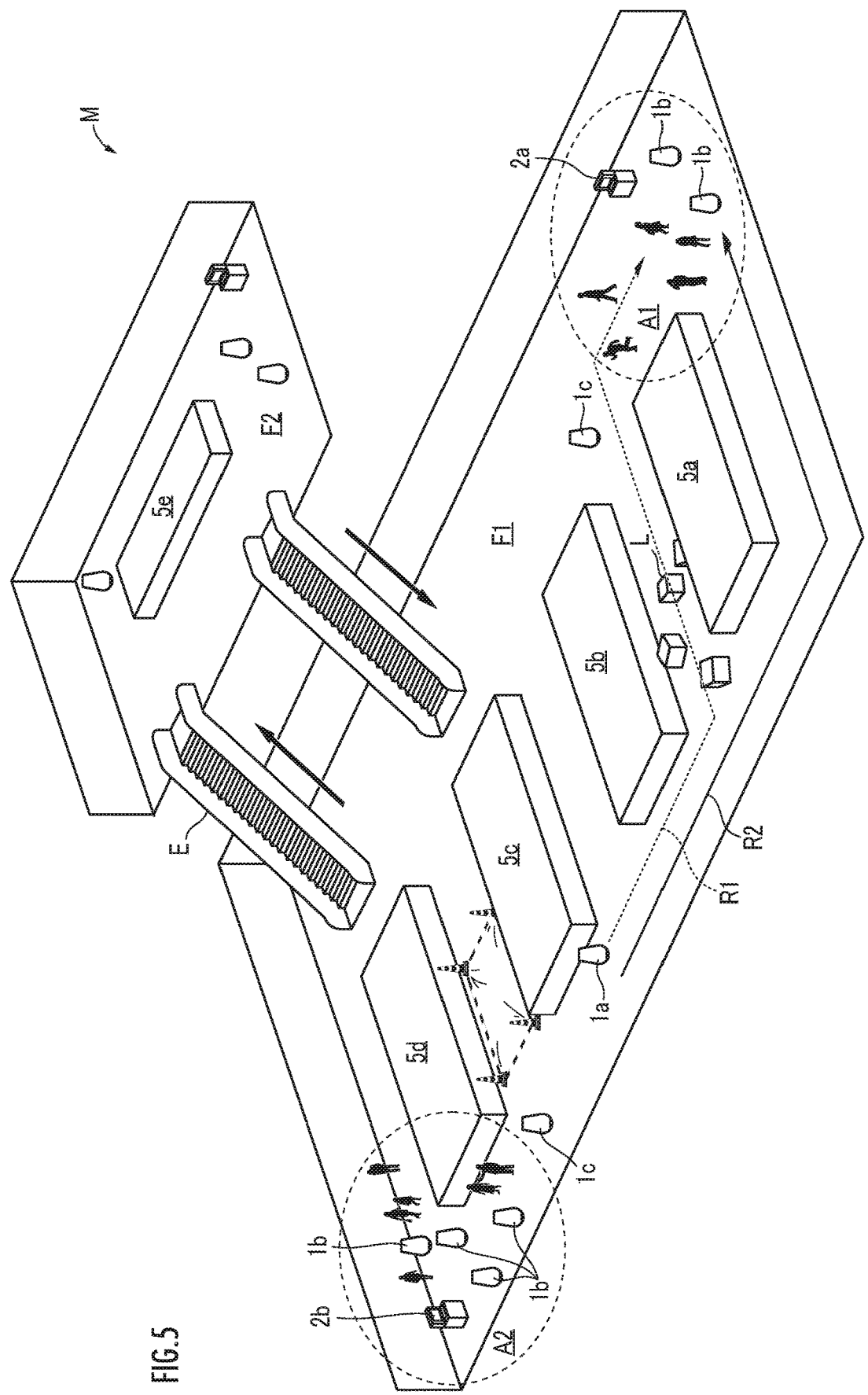

In the present embodiment, a description is given of a case where the guidance system S is adopted as a system for guiding a user to a shop (any one of shops 5a to 5e) that is a destination of the user in a mall M (see FIG. 5). However, the robot guidance system of the present invention is not limited to such a system, and may be any system which guides a user by using an autonomous mobile robot.

For example, apart from a mall, the robot guidance system of the present invention may also be adopted in other facilities such as an airport. Further, not only in facilities, the guidance system S may also be adopted as a system for guiding a user in a predetermined area (for example, a tourist attraction with a certain range, an entire shopping district, or the like).

First, a schematic configuration of the operation management system S will be described with reference to FIGS. 1 to 4.

Figure 1:
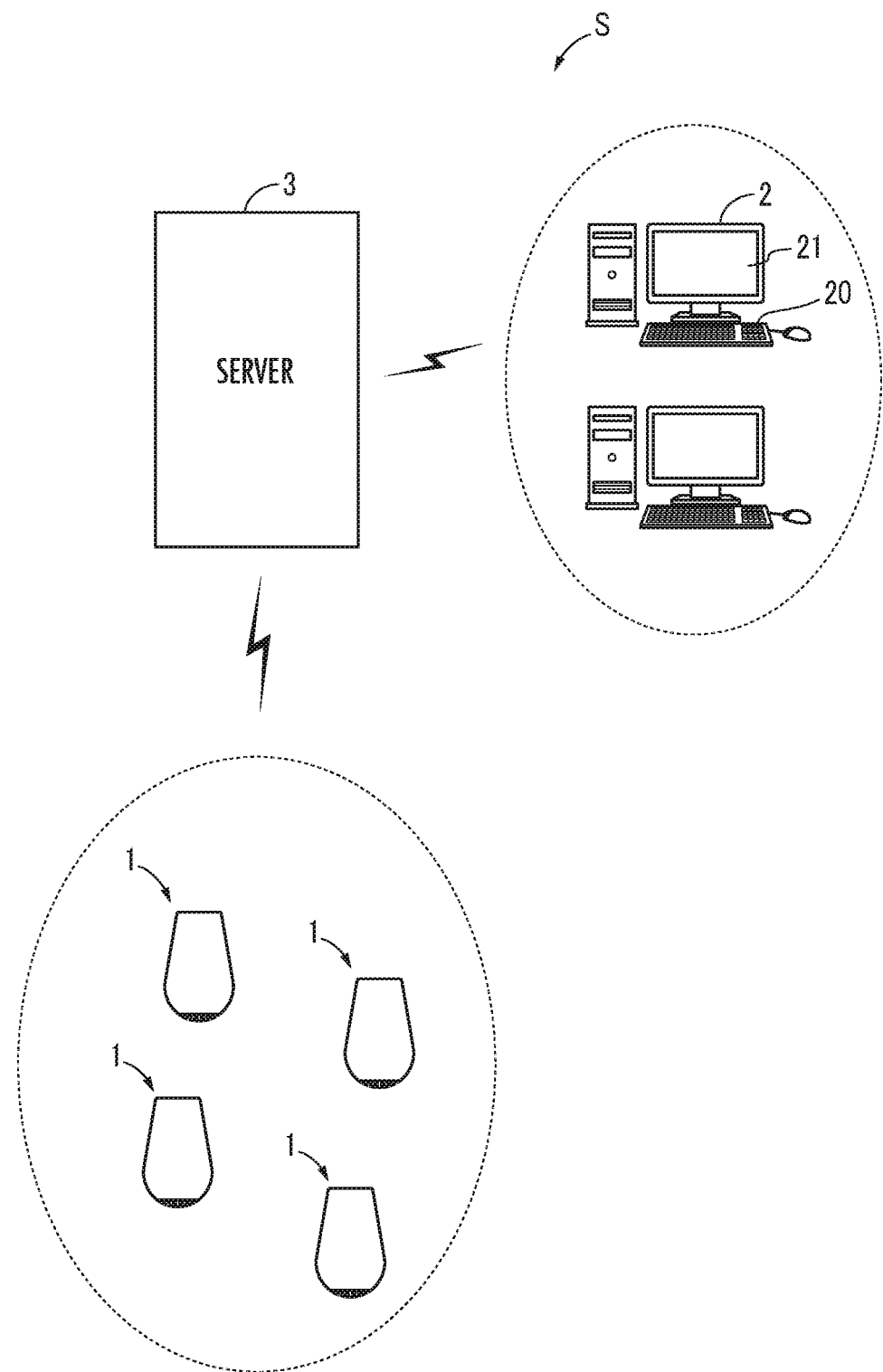
FIG. 1 is an explanatory diagram schematically showing a configuration of a guidance system according to an embodiment.

As shown in FIG. 1, the guidance system S includes a plurality of robots 1 (autonomous mobile robots) which autonomously move within a predetermined area, a reception apparatus 2 which is provided separately from the plurality of robots 1 and recognizes a destination of a user, and a server 3 which can mutually communicate with the robots 1 and the reception apparatus 2.

Figure 2:
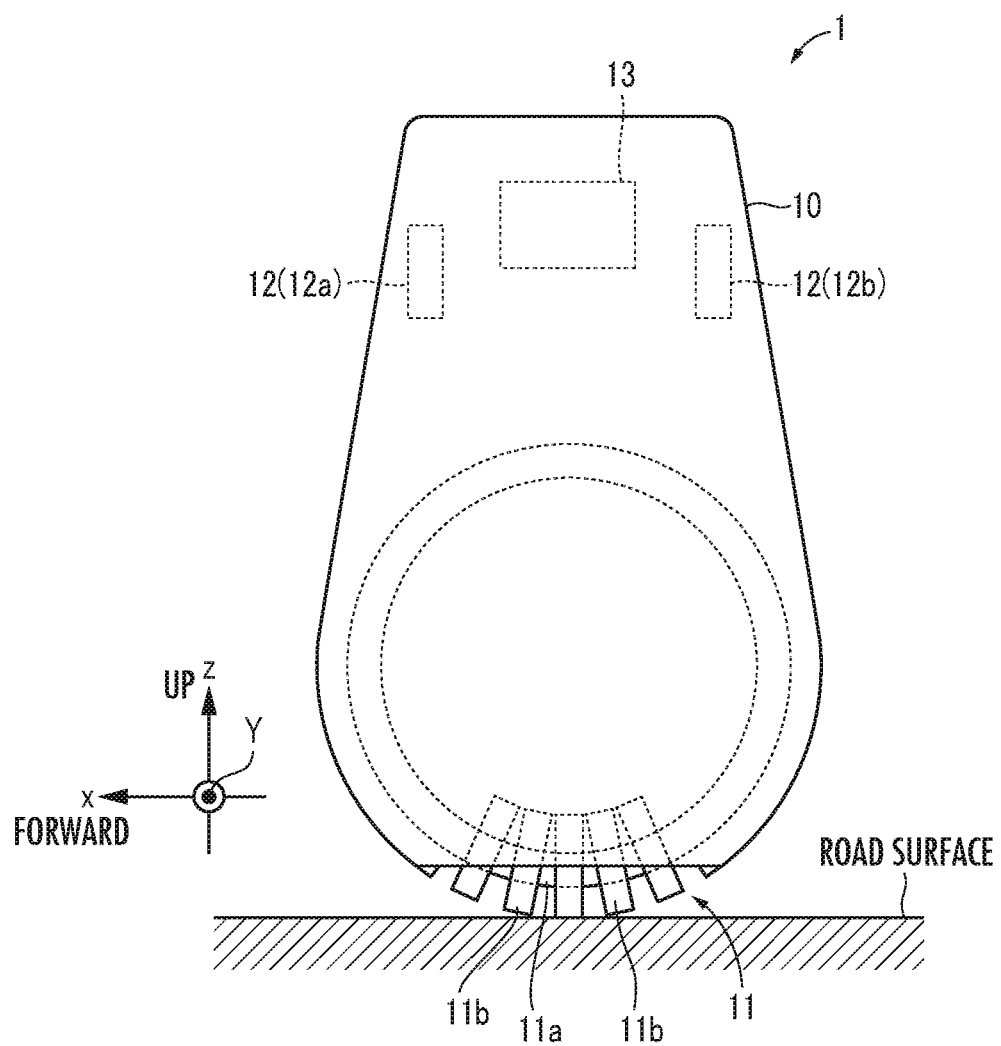
FIG. 2 is a side view showing an example of a robot in the guidance system in FIG. 1.

As shown in FIG. 2, each robot 1, which is what is called an inverted pendulum-type vehicle, includes a base body 10 and a traveling motion unit 11 provided at a lower portion of the base body 10.

Each robot 1 is configured to be able to move omnidirectionally (in any direction) on a road surface, with the traveling motion unit 11. The traveling motion unit 11 includes an annular core member 11a and a plurality of annular rollers 11b externally inserted into the core member 11a in alignment along a circumference (in a direction around an axial center) of the core member 11a at equiangular intervals. Note that only some of the rollers 11b are representatively shown in FIG. 2.

Each roller 11b is configured to be rotatable integrally with the core member 11a around the axial center of the core member 11a. Moreover, each roller 11b is configured to be rotatable about a central axis of a cross-sectional plane of the core member 11a at a position where the roller 11b is arranged (an axis in a direction of a tangent to a circle centered on the axial center of the core member 11a).

The thus configured traveling motion unit 11 can omnidirectionally move on a road surface, by driving the core member 11a to rotate about the axial center of the core member 11a and/or driving each roller 11b to rotate about the axial center of the roller 11b, in a state where the rollers 11b at the lower portion of the traveling motion unit 11 are in contact with the road surface (floor surface, ground surface, or the like) in an environment where the robot 1 moves.

An actuator apparatus 12 which generates driving force for moving the traveling motion unit 11 is mounted inside the base body 10. The actuator apparatus 12 includes a first actuator 12a which drives the core member 11a to rotate, and a second actuator 12b which drives each roller 11b to rotate. The first actuator 12a and the second actuator 12b may be configured by using, for example, electric motors, hydraulic actuators, of the like.

The first actuator 12a and the second actuator 12b apply rotation driving force to the core member 11a and each roller 11b, respectively, via a power transmission mechanism, depiction of which is omitted. For the power transmission mechanism, a known structure may be used.

Each robot 1 is driven by an internal battery 13, and a remaining battery charge amount of the battery 13 is transmitted to the server 3 via a communication apparatus 15, which will be described later, periodically or at a predetermined timing (for example, at a point of time when guidance is started or finished, or the like).

Figure 3:
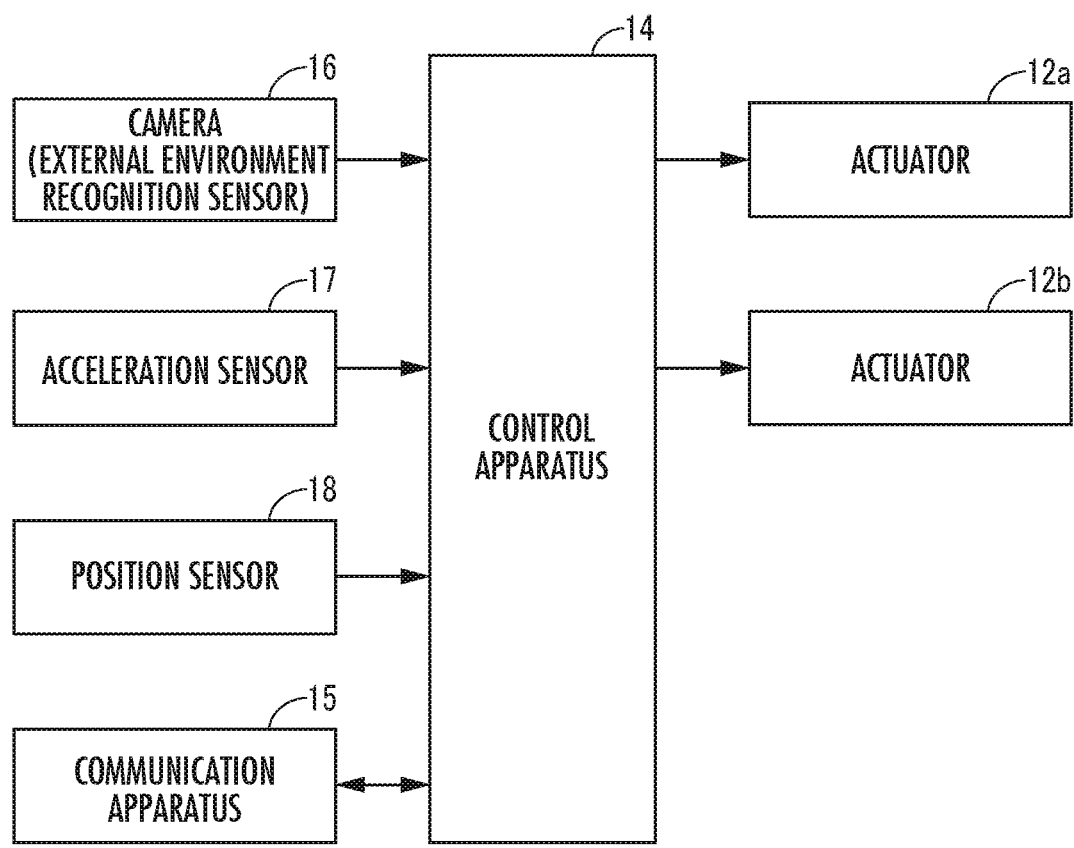
FIG. 3 is a block diagram showing a configuration related to motion control of the robot in FIG. 2.

Moreover, although depiction is omitted in FIG. 2, each robot 1 is equipped with: a control apparatus 14 configured by using an electronic circuit unit including a CPU, a RAM, a ROM, an interface circuit, and the like; various sensors for observing a motion state of the robot 1 or a state of an external environment (surrounding environment), and the like; and the communication apparatus 15 for allowing wireless communication between the server 3 and the control apparatus 14, as components for motion control of the robot 1, as shown in FIG. 3.

The sensors mounted on each robot 1 include, for example, a camera 16 (external environment recognition sensor) for recognizing an object (a human being, a moving object, an installed object, or the like) existing in an environment around the robot 1, an acceleration sensor 17 for detecting an acceleration of the robot 1, a position sensor 18 for detecting an own position of the robot 1, and the like. Outputs (detection data) from the sensors are inputted into the control apparatus 14.

For the external environment recognition sensor, any sensor may be used that is capable of recognizing the environment around the robot 1. Accordingly, for the external environment recognition sensor, for example, a ranging sensor such as a laser range finder, a radar apparatus, or the like may also be used in place of, or in addition to, the camera 16.

The control apparatus 14 is configured to include a function of performing motion control of the first actuator 12a and the second actuator 12b (further, movement control of the traveling motion unit 11), as a function implemented by a packaged hardware configuration or a program (software configuration).

Referring back to FIG. 1, the reception apparatus 2 is a desktop personal computer or a mobile information terminal (tablet, smartphone, or the like), and includes an input section 20, an output section 21, and a communication section (not shown).

The input section 20 is configured by using an input device such as a keyboard, a mouse, a touch panel, or a microphone. The output section 21 is configured by using an output device that transmits information to a user through five senses (for example, a liquid crystal display, a speaker, or the like). In the reception apparatus 2, an input interface for allowing a user to input a destination is configured by using the input section 20 and the output section 21.

Thus, information inputted by a user via the input section 20 is transmitted to the server 3 via the communication section. A result of processing performed by the server 3 based on the transmitted information (for example, which robot 1, among the plurality of robots 1, guides the user, or the like) is transmitted to the reception apparatus 2 via the communication section and presented to the user via the output section 21.

In the guidance system S, the thus configured reception apparatus 2 is installed at each of a plurality of points in a facility (for example, the mall M, which will be described later) where the guidance system S is installed. At each installation point, a waiting area for allowing a robot in a state of not guiding a user to stand by is provided (see FIG. 5).

Note that the reception apparatuses of the present invention are not limited to such a configuration. For example, only one reception apparatus may be installed in a facility. Further, for the reception apparatuses, mobile information terminals personally owned by users may be used.

Figure 4:
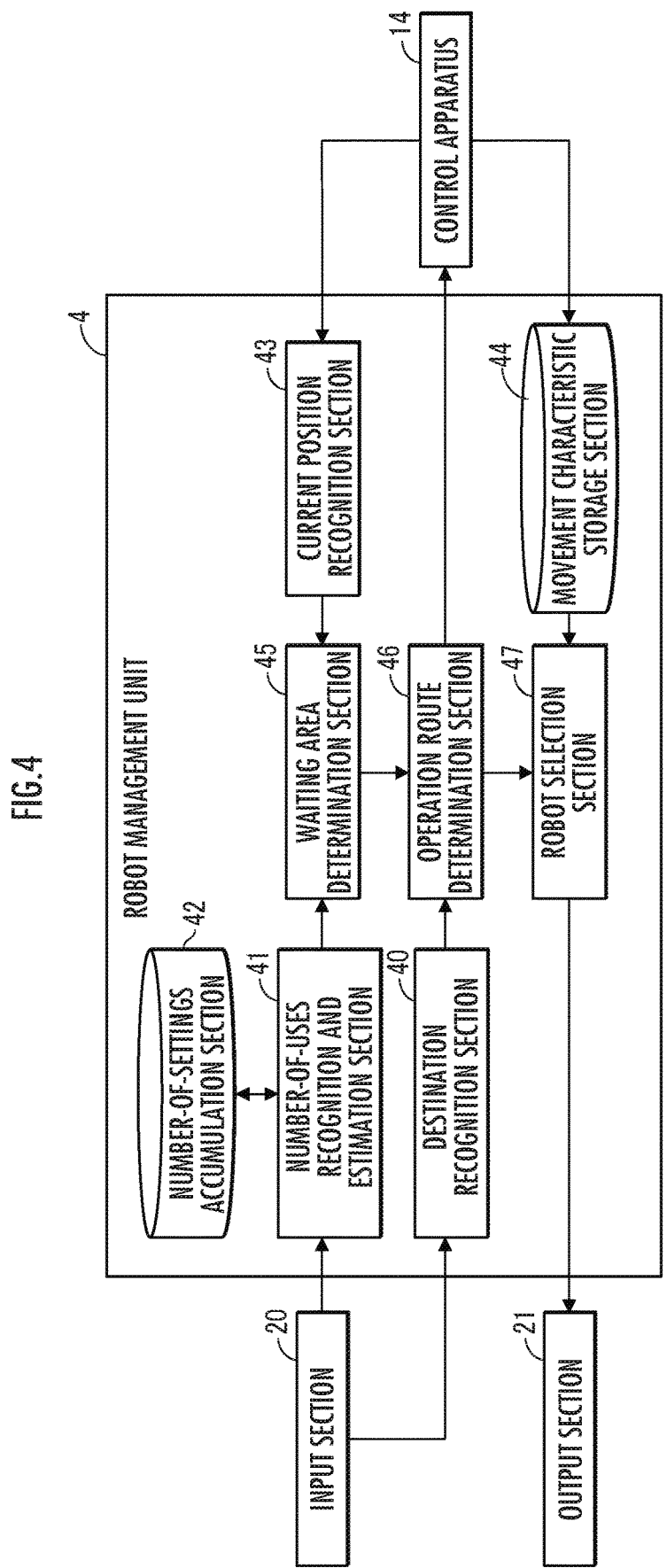
FIG. 4 is a block diagram showing a configuration of the guidance system in FIG. 1.

As shown in FIG. 4, the guidance system S includes a robot management unit 4, as a function implemented by a hardware configuration or a program packaged in at least one of the robots 1, the reception apparatuses 2, and the server 3.

The robot management unit 4 includes: a destination recognition section 40 which recognizes a destination of a user; a number-of-uses recognition and estimation section 41 which recognizes the number of uses of each reception apparatus 2; a number-of-settings accumulation section 42 which accumulates the number of times a destination candidate point is set as a destination; a current position recognition section 43 which recognizes a current position of each robot 1; a movement characteristic storage section 44 which stores a movement characteristic of each robot 1; a waiting area determination section 45 which determines a waiting area where each robot 1 stands by; an operation route determination section 46 which determines an operation route of each robot 1; and a robot selection section 47 which selects a robot 1 to guide a user.

The destination recognition section 40 recognizes a destination inputted by a user via the input section 20 of any reception apparatus 2. For the destination, for example, coordinates on a map displayed on the output section 21, as well as a specific destination such as any one of the shops 5a to 5e in the mall M, may be used.

For the number of past uses of each of the plurality of reception apparatuses 2, the number-of-uses recognition and estimation section 41 recognizes, via the reception apparatus 2, the number of past uses of the reception apparatus 2 (that is, the number of times users used the reception apparatus 2 to input a destination and request guidance) between a predetermined past point of time (for example, one hour before a current point of time) and the current point of time.

For each of the plurality of reception apparatuses 2, the number-of-uses recognition and estimation section 41 accumulates the number of uses for each time period of day (for example, for each one hour). Based on the accumulated data, the number-of-uses recognition and estimation section 41 estimates the number of predicted uses of each reception apparatus 2 for each time period of day.

For each of a plurality of destination candidate points, the number-of-settings accumulation section 42 accumulates the number of times the destination candidate point is set as a destination via the reception apparatuses 2.

The guidance system S of the present embodiment includes the number-of-settings accumulation section 42, whereby an important (for example, highly frequently used) destination can be easily recognized when an adjustment or the like is made to settings in the guidance system S. Thus, in the guidance system S, a function to be added to or adjusted in the operated robots 1 can be easily found according to a characteristic of the important destination (for example, a distance from a reception apparatus 2, or the like).

Note that the robot guidance system of the present invention is not limited to such a configuration. For example, in a case of a configuration in which system settings are made only at a time of installation, the number-of-settings accumulation section 42 may be omitted.

The current position recognition section 43 recognizes a current position of each of the plurality of robots 1, based on a signal from the control apparatus 14 of the robot 1. The current position recognition section 43 may also be configured to estimate the current position of each robot 1 by using a signal from a camera or the like installed in the facility where the guidance system S is installed, in place of, or in combination with, the signal from the control apparatus 14 of the robot 1.

The movement characteristic storage section 44 stores a movement characteristic of each of the plurality of robots 1. Here, the "movement characteristic" is a characteristic related to mobility of each robot 1, and is characteristic that can affect a motion for guidance when the robot 1 guides a user.

Examples of the movement characteristic include characteristics at a current point of time (that is, characteristics that change over time), such as a coverable distance based on a remaining battery charge amount, characteristics based on the configuration of each robot 1 (that is, characteristics that do not change over time), such as a size of the robot 1 (that is, a size of a path along which the robot 1 can move) and whether or not the robot 1 is boardable, and the like.

The waiting area determination section 45 determines, among a plurality of waiting areas, a waiting area where each of the plurality of robots 1 is caused to stand by, and the number of robots 1 caused to stand by in each of the plurality of waiting areas, based on the number of uses of each of the plurality of reception apparatuses 2 recognized by the number-of-uses recognition and estimation section 41.

Here, the "waiting area" is an area for a robot in a state of not guiding a user to stand by. In the guidance system S of the present embodiment, by determining a waiting area for each robot 1 as described above, occurrence of a situation where no robot 1 exists in a vicinity of a user when the user requests guidance is prevented. Thus, the guidance system S reduces a waiting time of the user.

Note that the robot guidance system of the present invention is not limited to such a configuration. For example, a position where a waiting area is provided is not limited to a vicinity of each reception apparatus, but may be set as appropriate depending on a shape or the like of a facility where the robot guidance system is installed. Moreover, for example, when only one waiting area is provided, or when there is no waiting area because robots 1 always make rounds, or the like, the number-of-uses recognition and estimation section and the waiting area determination section may be omitted.

The operation route determination section 46 determines an operation route of each of the plurality of robots 1, based on the destination recognized by the reception apparatus 2, and an environment around any robot 1 recognized by the camera 16 mounted on the robot 1.

Note that the robot guidance system of the present invention is not limited to such a configuration. For example, in the guidance system S of the present embodiment, an operation route is determined by referring to the environment around each robot 1 captured by the camera 16 mounted on the robot 1. However, an operation route may be determined only based on the recognized destination, without referring such a surrounding environment.

For example, in the guidance system S of the present embodiment, an operation route is determined based on environments recognized by the cameras 16 because an environment around a robot 1 recognized by the camera 16 mounted on the robot 1 is likely to become an environment around an operation route of another robot 1. However, when a sufficient number of sensors such as cameras are installed in a facility, an operation route may be determined based on environments recognized by such sensors.

The robot selection section 47 selects at least one of the plurality of robots 1 as a robot 1 to guide the user, based on the destination recognized by the reception apparatus 2 and the movement characteristic of each of the plurality of robots 1 stored in the movement characteristic storage section 44.

Specifically, in the guidance system S, based on a distance to the destination recognized by the reception apparatus 2, the operation route to the destination, the current positions of the plurality of robots 1, and a remaining battery charge amount of each of the plurality of robots 1, a robot 1 to guide the user is selected, as a rule, from among a plurality of robots 1 on standby in a waiting area provided around the reception apparatus 2.

With such a configuration, in the guidance system 5, the number of times of charging the robots 1 is reduced, and a waiting time of a user is reduced.

Note that the robot guidance system of the present invention is not limited to such a configuration. For example, in a case of a robot guidance system of a type of, unlike the guidance system S of the present embodiment, operating a plurality of kinds of autonomous mobile robots with different movement characteristics that do not change over time, a configuration may be made such that an autonomous mobile robot to guide a user is selected based on details (presence/absence of stairs, and the like) of a route of guidance, or the like.

With such a configuration, a robot from which a partial function (for example, a function capable of ascending/descending stairs, or the like) is omitted can also be adopted as a robot operated in the robot guidance system.

The guidance system S includes the thus configured robot management unit 4, whereby availability of each of the plurality of robots 1 is managed based on the recognized destination and the recognized state of each robot 1.

Here the "state" of a robot 1 refers to a state that can affect a motion for guidance when the robot 1 guides a user, such as a position of the robot 1, a movement characteristic related to mobility of the robot 1 (for example, a remaining battery charge amount or the like), or the like.

Next, processing performed by the guidance system S will be described with reference to FIGS. 5 to 7. Here, as an example, a description is given of a case where the guidance system S is adopted in the mall M, as a system which guides a user to a destination shop.

Figure 6:
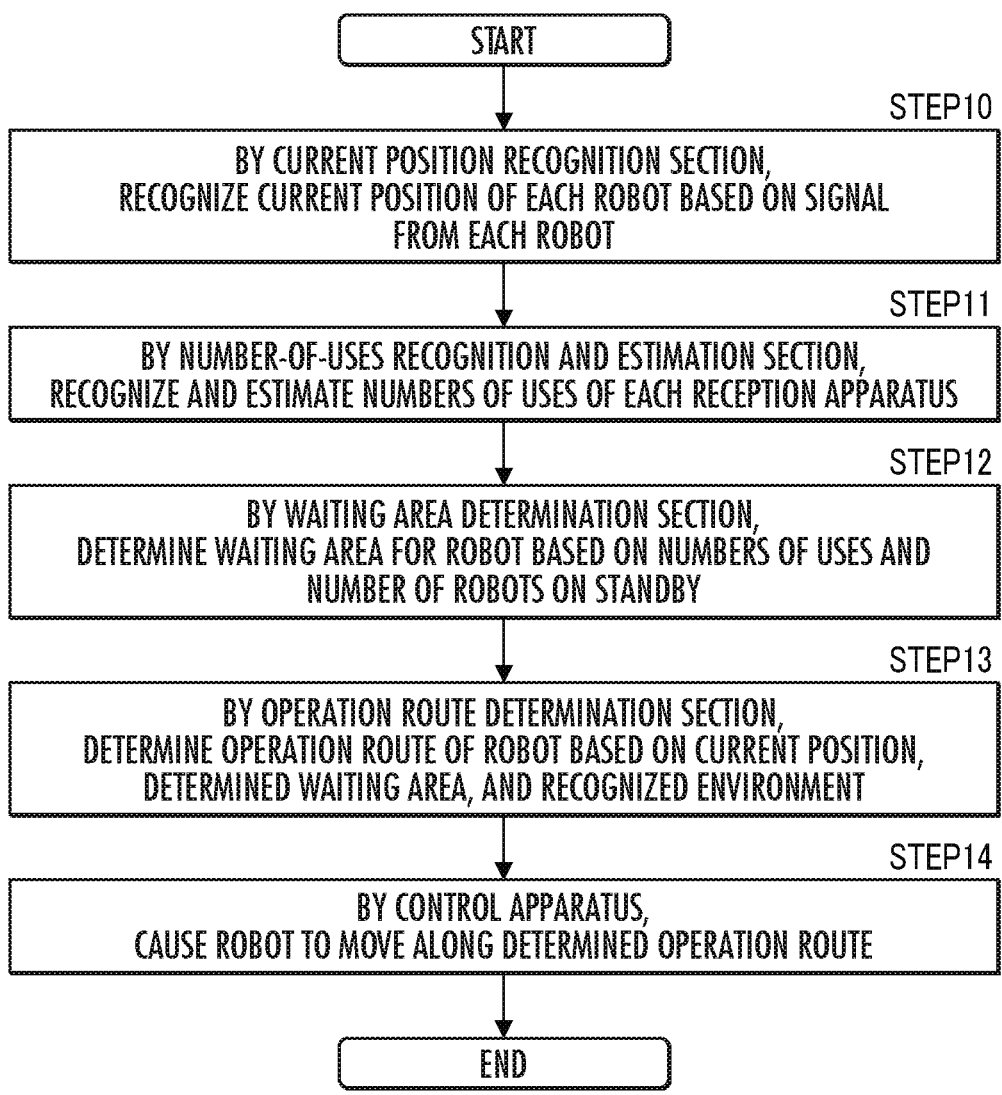
FIG. 6 is a flowchart showing processing performed when the guidance system in FIG. 1 causes the robot to stand by in a waiting area.

First, referring to FIGS. 5 and 6, a description is given of processing performed by the guidance system S when the guidance system S causes a robot 1*a* in a state of not guiding a user or a state of finishing guiding a user to stand by in any one of a waiting area A1 provided around a reception apparatus 2*a* and a waiting area A2 provided around a reception apparatus 2*b*. FIG. 6 is a flowchart showing the processing performed by the guidance system S in such a case.

In the processing, first, the current position recognition section 43 of the robot management unit 4 recognizes a current position of each robot 1, based on a signal from the control apparatus 14 of each of the plurality of robots 1 (FIG. 6/STEP 10).

Next, the number-of-uses recognition and estimation section 41 of the robot management unit 4 recognizes the respective numbers of past uses of the reception apparatus 2*a* and the reception apparatus 2*b*, based on the information stored in the number-of-settings accumulation section 42, and estimates the respective numbers of predicted uses of the reception apparatus 2*a* and the reception apparatus 2*b* (FIG. 6/STEP 11).

Next, the waiting area determination section 45 of the robot management unit 4 determines in which of the waiting area A1 and the waiting area A2 the robot 1*a* is caused to stand by, based on the numbers of uses recognized and estimated by the number-of-uses recognition and estimation section 41, the number of robots 1*b* already on standby in the waiting area A1, and the number of robots 1*b* already on standby in the waiting area A2 (FIG. 6/STEP 12).

In the present embodiment, it is assumed that the waiting area A1 is determined as a waiting area where the robot 1*a* is caused to stand by because the number of uses of the reception apparatus 2*a* corresponding to the waiting area A1 is approximately the same as the number of uses of the reception apparatus 2*b* corresponding to the waiting area A2, and the number of robots 1*b* on standby in the waiting area A1 is smaller than the number of robots 1*b* on standby in the waiting area A2.

Next, the operation route determination section 46 determines an operation route for the robot 1*a* to move to the waiting area A1, based on the current position of the robot 1*a*, a position of the determined waiting area A1, and an environment recognized by another robot 1*c* (FIG. 6/STEP 13).

Specifically, since the robot 1*c* that is making rounds recognizes an environment that obstructs a movement of the robot 1*a* (in the present embodiment, a fact that incoming packages L exist between the shop 5*a* and the shop 5*b*) on a first route R1 that can be the operation route, the operation route determination section 46 determines not the first route R1 that passes through the environment but a second route R2 that detours the environment, as the operation route of the robot 1*a*.

Lastly, the control apparatus 14 of the robot 1*a* causes the robot 1*a* to move to the waiting area A1 along the operation route determined by the operation route determination section 46 (FIG. 6/STEP 14), and the present processing is terminated.

Through the processing as described above, the robot 1*a* in the state of not guiding a user or in the state of finishing guiding a user is caused to stand by in the waiting area A1 provided around the reception apparatus a1.

Figure 7:
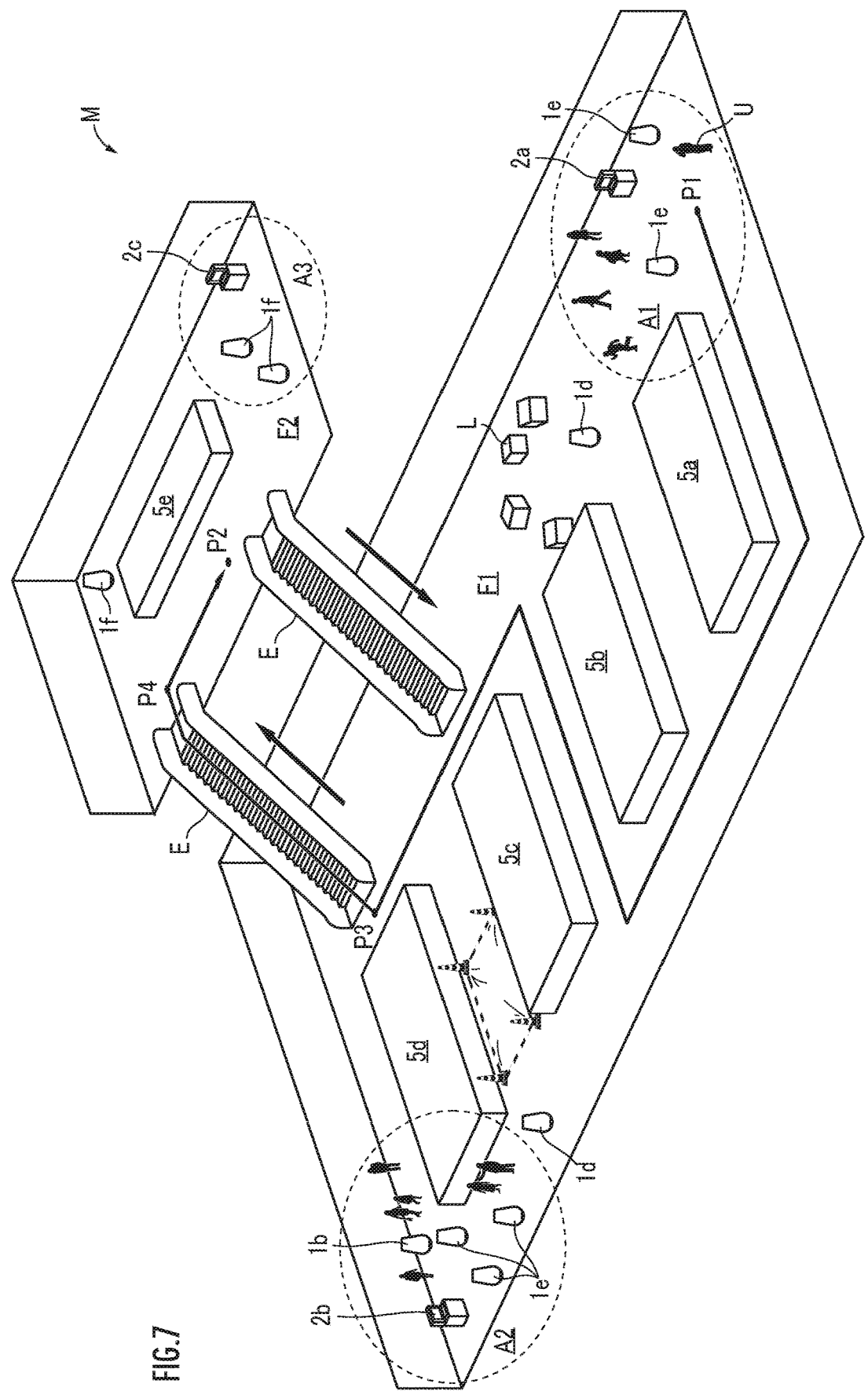
FIG. 7 is a schematic diagram showing an operation route when the guidance system in FIG. 1 guides a user.

Next, referring to FIGS. 7 and 8, a description is given of processing performed when the guidance system S sets operation routes of a robot 1*d* and a robot 1*e* to guide a user 11 from a point P1 (a vicinity of the reception apparatus 2*a*) toward a point P2 (an entrance of the shop 5*e*). FIG. 8 is a flowchart showing the processing performed by the guidance system S in such a case.

In the processing, first, the destination recognition section 40 of the robot management unit 4 recognizes a destination inputted by the user via the input section 20 of the reception apparatus 2a (FIG. 8/STEP 20).

In the present embodiment, it is assumed that the user 11 who is present near the reception apparatus 2a (at the point P1) on a first floor F1 requests guidance to the entrance of the shop 5e (to the point P2) on a second floor F2 that is an upper floor requiring a movement via an escalator E.

At the time, the number-of-uses recognition and estimation section 41 of the robot management unit 4 recognizes input information including the destination inputted by the user U, and accumulates the input information in the number-of-settings accumulation section 42 (FIG. 8/STEP 21).

Specifically, examples of the input information include information for identifying the reception apparatus 2a (for example, an installation position or the like), the inputted destination, and time when the input is made (for example, a time of input, a time period of day set by dividing a day into equal predetermined intervals, in the morning or in the afternoon, or the like).

Next, the operation route determination section 46 of the robot management unit 4 determines a route for guidance (that is, an operation route of the robot 1d), based on a position of the reception apparatus 2a that has received the input, the destination recognized by the reception apparatus 2a, and an environment around the robot 1d recognized by the camera 16 mounted on the robot 1d (FIG. 8/STEP 22).

In the present embodiment, the operation route determination section 46 determines, as the operation route, a third route R3 that starts from the position of the reception apparatus 2a (point P1) that has received the input and can detour packages L existing around the shop 5b, a construction site between the shop 5c and the shop 5d, a crowd around the reception apparatus 2b, and the like.

As described above, in the guidance system S, the operation route is determined also by referring to the environments around the robot 1d recognized by the camera 16 (external environment recognition sensor) mounted on the robot 1d.

In the guidance system S, the robots 1d, 1e existing on the first floor F1 have approximately identical capabilities (for example, sizes, traveling performance, and the like). Accordingly, it is highly probable that an environment that hinders a movement of the robot 1d (first autonomous mobile robot) actually used to guide the user U will also hinder a movement of the robot 1e (second autonomous mobile robot). Further, it is highly probable that a movement of the user U guided by the robot 1d or the robot 1e is also hindered.

Accordingly, in the guidance system S, a configuration is made such that an operation route of the robot 1e is determined based on the environments recognized by the robot 1d, so that movements of the robot 1e and the user U guided by the robot 1e can be performed smoothly.

Note that the first autonomous mobile robot and the second autonomous mobile robot in the robot guidance system of the present invention are not limited to such a configuration, and do not necessarily need to have identical capabilities.

When the first autonomous mobile robot and the second autonomous mobile robot have different capabilities, it is preferable that the operation route determination section is configured to determine the operation route, based on an environment recognized by the sensor of the first autonomous mobile robot and a difference in capability between the first autonomous mobile robot and the second autonomous mobile robot.

Next, the robot selection section 47 of the robot management unit 4 selects a robot to guide the user U from among robots 1d to 1f, based on the determined operation route (that is, the destination recognized by the reception apparatus 2a), and movement characteristics of the robots 1d to 1f stored in the movement characteristic storage section 44 (FIG. 8/STEP 23).

In the present embodiment, the robot selection section 47 uses, for criteria for making a selection, a fact that the determined operation route includes the escalator E (that is, the operation route includes an environment that does not hinder a movement of the user U and hinders movements of the robots 1d to 1f), respective current positions of the robots 1d to 1f, a characteristic of being incapable of moving on the escalator E, and remaining battery charge amounts.

Based on the criteria, first, the robot selection section 47 recognizes that not only a robot is required that guides the user U in a first section, which is a section from the vicinity of the reception apparatus 2a (the point P1) to a front of the escalator E (a point P3) on the first floor P1, but also a robot is required that guides the user U in a second section, which is a section from a point of getting off the escalator E (a point P4) to the entrance of the shop 5e (the point P2).

In other words, the robot selection section 47 recognizes that it is necessary to make arrangement such that a plurality of robots cooperate to cover a problem based on the traveling performance of the robots 1d to 1f, that is, incapability of passing through the escalator E.

Thereafter, the robot selection section 47 selects a robot (third autonomous mobile robot) to guide the user U in the first section.

Specifically, the robot selection section 47 sets a plurality of robots 1e on standby in the waiting area A1 provided around the reception apparatus 2a, as candidates for guiding the user in the first section.

Then, among the plurality of robots 1e set as candidates, a robot with a smallest remaining battery charge amount that exceeds an amount required, after moving over the first section, to move to a nearest waiting area (in the present embodiment, the waiting area A2 provided around the reception apparatus 2b) is selected as the robot to guide the user in the first section.

When no robot stands by in the waiting area A1, or when the robots 1e on standby have insufficient remaining battery charge amounts, or the like, the robot selection section 47 sets not only the robots 1e on standby in the waiting area A1 but also a robot existing in a place other than the waiting area A1 (for example, the robot 1d), as candidates for the robot to guide the user U in the first section.

Further thereafter, the robot selection section 47 selects a robot (fourth autonomous mobile robot) to guide the user U by taking over from the robot 1e that has guided the user U in the first section.

Specifically, among a plurality of robots 1f existing in a place past the escalator E (on the second floor F2), the robot selection section 47 selects, as a robot to guide the user in the second section, a robot with a smallest remaining battery charge amount that exceeds an amount required, after starting from a current position, passing through a point of receiving the user U (that is, the point P4), and moving over the second section, to move to a nearest waiting area (in the present embodiment, a waiting area A3 provided around a reception apparatus 2c).

Lastly, the control apparatus 14 of the selected robot 1e causes the selected robot 1e to move from the point P1 to the point P3 along the operation route determined by the operation route determination section 46, whereby the user U is guided in the first section. Moreover, the control apparatus 14 of the selected robot 1f causes the selected robot 1f to move to the point P4 before the robot 1e moves to the point P3, and to move from the point P4 to the point P2 after the user U has passed through the escalator E, along the operation route determined by the operation route determination section 46, whereby the user U is guided in the second section (FIG. 8/STEP 24), and the present processing is terminated.

The robots 1e, 1f that have finished guidance move to the nearest waiting areas (waiting area A2, waiting area A3), respectively.

As described above, in the guidance system S of the present embodiment, a robot 1 which actually guides a user and a reception apparatus 2 which recognizes a destination of the user (that is, including an interface for receiving a user input) are configured independently of each other.

Thus, an interface for receiving an input from a user can be omitted from the robot 1. Accordingly, according to the guidance system S of the present embodiment, the configuration of the robot 1 which guides a user can be simplified.

In the thus configured guidance system 5, when the robot management unit 4 is configured by using the hardware configuration or the program packaged in the reception apparatuses 2a to 2c and the server 3, the plurality of robots 1 can be managed by the reception apparatuses 2a to 2c in a distributed manner, or can be managed by the server 3 in a centralized manner.

Thus, unification and multiplication of management can be set as appropriate depending on a facility where the guidance system S is installed, and accordingly, management and operation of the robots 1 after installation can be performed promptly and easily.

Although the embodiment shown in the drawings has been described above, the present invention is not limited to such an embodiment.

For example, in the above-described embodiment, in addition to the robots 1, the reception apparatuses 2, and the server 3, the robot management unit 4 is included as a function implemented by the hardware configuration or the program packaged in any of the robots 1, the reception apparatuses 2, and the server 3. However, the robot guidance system of the present invention is not limited to such a configuration, and a configuration including the autonomous mobile robot, the reception apparatus, and the robot management unit may be made. For example, the robot management unit may be provided to the reception apparatus, or may be mounted in each or any one of a plurality the autonomous mobile robots.

The robots 1 in the guidance system S of the above-described embodiment are robots which lead a user by moving along with the user, and each of the plurality of robots 1 includes similar functions. However, the robot guidance system of the present invention is not limited to such a configuration, and various and diverse robots may be adopted, depending on a size, a structure, and the like of a facility to which the robot guidance system is applied.

For example, a robot capable of being boarded by a user (boardable robot) may be adopted together with a robot incapable of being boarded by a user (non-boardable robot) which only leads a user by moving along with the user. When a plurality of types of robots are adopted as described above, a configuration may be made such that the robot selection section selects a robot to perform guidance, based on a destination and a movement characteristic of the robot (for example, a characteristic of being only capable of leading, or being boardable (capability of being boarded)).

As examples of the reception apparatuses 2 in the guidance system S of the above-described embodiment, a desktop personal computer and a mobile information terminal are cited. However, the reception apparatus of the present invention is not limited to such a configuration, and any apparatus may be used that can recognize a destination of a user and is provided separately from the autonomous mobile robots.

For example, a robot may be used that resembles a shape of a human being or the like and is configured to have conversations with a user. Specifically, a humanoid robot including a microphone as an input interface, a speaker as an output interface, and manipulators resembling shapes of a head and hands of a human being may be used.

REFERENCE SIGNS LIST 1, 1a, 1b, 1c, 1d, 1e, 1f . . . robot (autonomous mobile robot), 2, 2a, 2b, 2c . . . reception apparatus, 3 . . . server, 4 . . . robot management unit, 5a, 5b, 5c, 5d, 5e . . . shop, 10 . . . base body, 11 . . . traveling motion unit, 11a . . . core member, 11b . . . roller, 12 . . . actuator apparatus, 12a . . . first actuator, 12b . . . second actuator, 13 . . . battery, 14 . . . control apparatus, 15 . . . communication apparatus, 16 . . . camera (external environment recognition sensor), 17 . . . acceleration sensor, 18 . . . position sensor, 20 . . . input section, 21 . . . output section, 40 . . . destination recognition section, 41 . . . number-of-uses recognition and estimation section, 42 . . . number-of-settings accumulation section, 43 . . . current position recognition section, 44 . . . movement characteristic storage section, 45 . . . waiting area determination section, 46 . . . operation route determination section, 47 . . . robot selection section, A1, A2, A3 . . . waiting area, E . . . escalator, F1 . . . first floor, F2 . . . second floor, L . . . package, M . . . mall, P1, P2, P3, P4 . . . point, R1 . . . first route, R2 . . . second route, S . . . guidance system (robot guidance system), U . . . user.

The invention claimed is:

1. A robot guidance system, comprising:
a plurality of autonomous mobile robots which are driven by an internal battery, and in a state of not guiding a user, stand by at one of a plurality of waiting areas, and when a destination of the user is recognized, move from the waiting area to guide the user to the destination;
a reception apparatus which is provided separately from the plurality of autonomous mobile robots and recognizes the destination;
a robot management unit which recognizes a state of each of the plurality of autonomous mobile robots and manages availability of each of the plurality of autonomous mobile robots based on the recognized destination and the recognized state;
a movement characteristic storage section which stores a movement characteristic that is a characteristic including a remaining battery charge amount of each of the plurality of autonomous mobile robots;
a robot selection section which selects at least one of the plurality of autonomous mobile robots as an autonomous mobile robot to guide the user; and
a waiting area determination section which determines, among the plurality of waiting areas, a waiting area where each of the plurality of autonomous mobile robots is caused to stand by,
wherein
the robot selection section selects at least one of the plurality of autonomous mobile robots standing by in a waiting area nearest to the reception apparatus as the autonomous mobile robot to guide the user, based on a distance to the destination recognized by the reception apparatus, the remaining battery charge amount of each of the plurality of autonomous mobile robots, and a distance between the destination and a waiting area nearest to the destination among the plurality of waiting areas, the robot selection section selects the autonomous mobile robot with a smallest remaining battery amount that exceeds an amount required to move to the waiting area nearest to the destination after guiding the user to the destination among the plurality of autonomous mobile robots as the autonomous mobile robot to guide the user, and when the robot selection section determines that the plurality of autonomous mobile robots standing by in the waiting area nearest to the reception apparatus have an insufficient remaining battery amount to complete travel to the waiting area nearest to the destination after guiding the user to the destination, the robot selection section expands selection of the autonomous mobile robot to the plurality of autonomous mobile robots standing by at waiting areas of the plurality of waiting areas other than the waiting area nearest to the reception apparatus.

2. The robot guidance system according to claim 1, further comprising:
   a plurality of the reception apparatuses; and
   a number-of-uses recognition and estimation section which recognizes respective numbers of past uses of the reception apparatuses, or estimates respective numbers of predicted uses of the reception apparatuses,
   wherein the waiting area determination section determines, based on the numbers of uses, the waiting area where each of the plurality of autonomous mobile robots is caused to stand by among the plurality of the waiting areas, and the number of the autonomous mobile robots caused to stand by in each of the plurality of waiting areas.

3. The robot guidance system according to claim 1, further comprising:
   an operation route determination section which determines an operation route of each of the plurality of autonomous mobile robots,
   wherein the plurality of autonomous mobile robots include a first autonomous mobile robot and a second autonomous mobile robot having capabilities different than the first autonomous mobile robot,
   the first autonomous mobile robot includes a camera which recognizes an environment around the first autonomous mobile robot, and
   the operation route determination section determines the operation route of the second autonomous mobile robot, based on the destination recognized by the reception apparatus, the environment recognized by the camera of the first autonomous mobile robot, and a difference in the capabilities between the first autonomous mobile robot and the second autonomous mobile robot.

4. The robot guidance system according to claim 1, further comprising:
   an operation route determination section which determines an operation route of each of the plurality of autonomous mobile robots; and
   a sensor which recognizes an environment around the operation route,
   wherein the plurality of autonomous mobile robots include a first autonomous mobile robot and a second autonomous mobile robot to guide the user by taking over from the first autonomous mobile robot, and
   when an environment that does not hinder a movement of the user and hinders a movement of the first autonomous mobile robot is recognized around the operation route of the first autonomous mobile robot, the operation route determination section determines the operation route of the second autonomous mobile robot such that the second autonomous mobile robot moves to a position past the environment.

5. The robot guidance system according to claim 1, further comprising:
   a number-of-settings accumulation section which accumulates a number of times each of a plurality of points is set as the destination of the user.

6. The robot guidance system according to claim 1, further comprising:
   an operation route determination section which determines an operation route of each of the plurality of autonomous mobile robots,
   wherein the plurality of autonomous mobile robots include a first autonomous mobile robot and a second autonomous mobile robot,
   the first autonomous mobile robot includes a camera which recognizes an environment around the first autonomous mobile robot,
   the environment includes at least one external camera or sensor, or a combination thereof, which is externally provided from the plurality of autonomous mobile robots and which recognizes the environment, and
   the operation route determination section determines the operation route of the second autonomous mobile robot, based on the destination recognized by the reception apparatus, the environment recognized by the camera of the first autonomous mobile robot, and the environment recognized by the at least one external camera or sensor.

* * * * *